(12) United States Patent
Mihic et al.

(10) Patent No.: US 9,674,439 B1
(45) Date of Patent: Jun. 6, 2017

(54) VIDEO STABILIZATION USING CONTENT-AWARE CAMERA MOTION ESTIMATION

(71) Applicant: Intel Corporation, Santa Clara, CA (US)

(72) Inventors: Bosko Mihic, Novi Sad (RS); Stojan Rakic, Belgrade (RS); Dusan Zoric, Belgrade (RS); Zdravko Pantic, Belgrade (RS)

(73) Assignee: Intel Corporation, Santa Clara, CA (US)

( * ) Notice: Subject to any disclaimer, the term of this patent is extended or adjusted under 35 U.S.C. 154(b) by 13 days.

(21) Appl. No.: 14/957,435

(22) Filed: Dec. 2, 2015

(51) Int. Cl.
*H04N 5/232* (2006.01)
*H04N 5/14* (2006.01)
*G06K 9/62* (2006.01)
*G06K 9/46* (2006.01)
*G06K 9/42* (2006.01)
*G06T 7/20* (2017.01)

(52) U.S. Cl.
CPC ........... *H04N 5/23254* (2013.01); *G06K 9/42* (2013.01); *G06K 9/4661* (2013.01); *G06K 9/6202* (2013.01); *G06K 9/623* (2013.01); *G06T 7/2033* (2013.01); *H04N 5/145* (2013.01); *H04N 5/23267* (2013.01)

(58) Field of Classification Search
None
See application file for complete search history.

(56) References Cited

U.S. PATENT DOCUMENTS

2006/0147090 A1* 7/2006 Yang .................. H04N 5/145
382/107

* cited by examiner

*Primary Examiner* — Mark T Monk
(74) *Attorney, Agent, or Firm* — Blakely, Sokoloff, Taylor & Zafman LLP

(57) ABSTRACT

Video stabilization is described using content-aware camera motion estimation. In some versions a luminance target frame and a luminance source frame of a sequence of video frames of a scene are received. Motion is extracted from the received luminance target and source frames and the motion is represented as a motion vector field and weights. The weights are divided into a first set of zeros weights for motion in the motion vector field that is near zero motion and a second set of peak weights for motion in the motion field that is not near zero. The zeros weights are compared to a threshold to determine whether there is motion in the scene and if the zeros weights exceed the threshold then selecting a zero motion motion model. A frame of the video sequence is adjusted corresponding to the target frame based on the selected motion model.

20 Claims, 13 Drawing Sheets

VIDEO STABILIZATION USING CONTENT-AWARE CAMERA MOTION ESTIMATION

FIELD

The present description relates to the field of video image processing and, in particular, to stabilizing a video using content-aware weights.

BACKGROUND

Digital video recording devices are becoming smaller, cheaper and more common and can now be found in a broad range of consumer electronic devices, including cellular telephones, smartphones, digital cameras, action cameras, and automobiles. The demand for video capture has been bolstered by new and growing online media services.

Video stabilization attempts to align video frames that are misaligned because of hand motions or platform vibrations. As small, lightweight hand held devices are used more for video capture, more video suffers from this misalignment. To stabilize the video, the motion of the camera is estimated. This motion is then smoothed and compensated. Motion smoothing attempts to allow for slow intentional hand motions like panning and zooming. Motion compensation attempts to compensate for shaky unintentional hand motions.

Many of these devices offer built-in video processing technologies. The processing may be performed as the video is received or it may be performed later in a computer workstation. The processing may include stabilization, object tracking, object recognition, exposure compensation, and many others. Stabilization techniques may be used to allow pleasing videos to be captured without the need for a stable support such as tripod or dolly.

Many video stabilization techniques rely on first estimating the camera's motion so that it can be distinguished from motion in the scene. Camera motion may be used in digital video stabilization (DVS), and also in frame rate conversions (FRC) and different multi-frame computational photography (CP) algorithms. Camera motion estimation is directed toward compensating movements for smooth transitions in areas that a viewer will perceive as a background. Areas that contain local motion, typically the foreground, can be handled differently using the camera motion as well.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

A mechanism is described for performing better background region detection on input images. The mechanism may be used for continuous capture. The background region detection may be used as a guide for performing camera motion estimation that is robust to local motions. Typically, notable changes in the characteristics of a background scene can generate glitches that significantly degrade the perceived quality of the output in digital video stabilization (DVS) video.

Temporal filtering may be applied to spatial weight maps based on the content of two input images and on the results of motion extractor engines (either block based or feature based). This is computationally efficient and allows real-time processing to be provided on low-power platforms. The efficiency comes in part from using a large downscale factor in the intermediate results (up to 32×).

As described herein the spatial locations of the background regions are tracked through time. This tracking makes the system much more efficient in selecting motion features or motion vectors that truly come from camera motion rather than from motion in the scene. The system is also very stable.

Figure 1A:
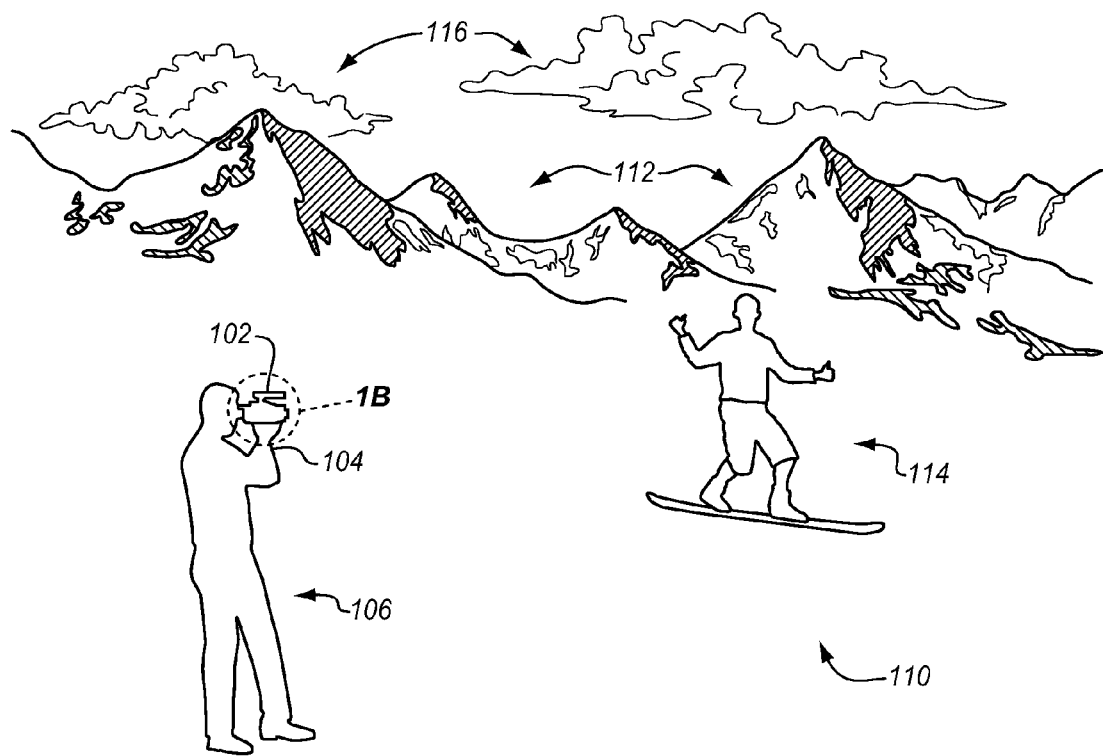
FIG. 1A is a diagram of capturing video subject to camera and subject motion.

FIG. 1A is a diagram showing an example situation for recording video using a video camera that is not stabilized. A camera 102 is held in the hand 104 of a videographer 106 who is aiming the camera at a scene 110. The camera is likely to shake or jitter in the hand of the videographer because it is not stabilized. This may also occur if the videographer has mounted the camera to a larger platform (not shown) such as a vehicle which is not stabilized. The videographer has aimed the camera at a scene which has a fixed mountain background 112 and a moving foreground object 114 such as a snowboard rider. The scene also has moving background clouds 116. This is provided as a common example but the elements in the scene may be varied to suit the desires of the videographer.

Figure 1B:
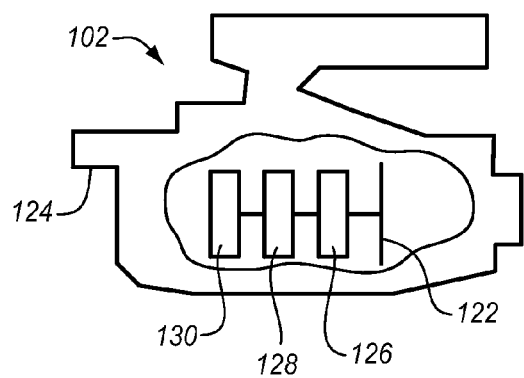
FIG. 1B is a diagram of a video capture device.

The video camera 102 is shown in an expanded diagram view in FIG. 1B with a lens 120 to image the scene onto an image sensor 122. There may be shutters, controllable aperture diaphragms, filters, shades and other elements (not shown) between the lens and the image sensor. The image sensor data is provided to a sample and hold circuit 126 to convert the data into a set of pixel values. The pixel values are then processed in an image processor 128. The system is controlled by a general purpose processor 130 which presents a user interface and image view on a touchscreen display 124 and may present one or more additional user interface and communication elements. The camera may have many more or fewer components than shown, depending on the particular implementation.

The described embodiments may be used to analyze and correct VHDR (Video High Dynamic Range) output frames from an input sequence. Camera motion may be compensated whether are not there is significant foreground or background motion. PMMR (Previous Mismatch Region) Slow and PMMR Fast maps may be used in the processing. Strong local motions do not generate motion artifacts on regions that remain in a scene. The techniques described herein are also well suited for execution using a graphics processor due to the iterative approaches.

Figure 2A:
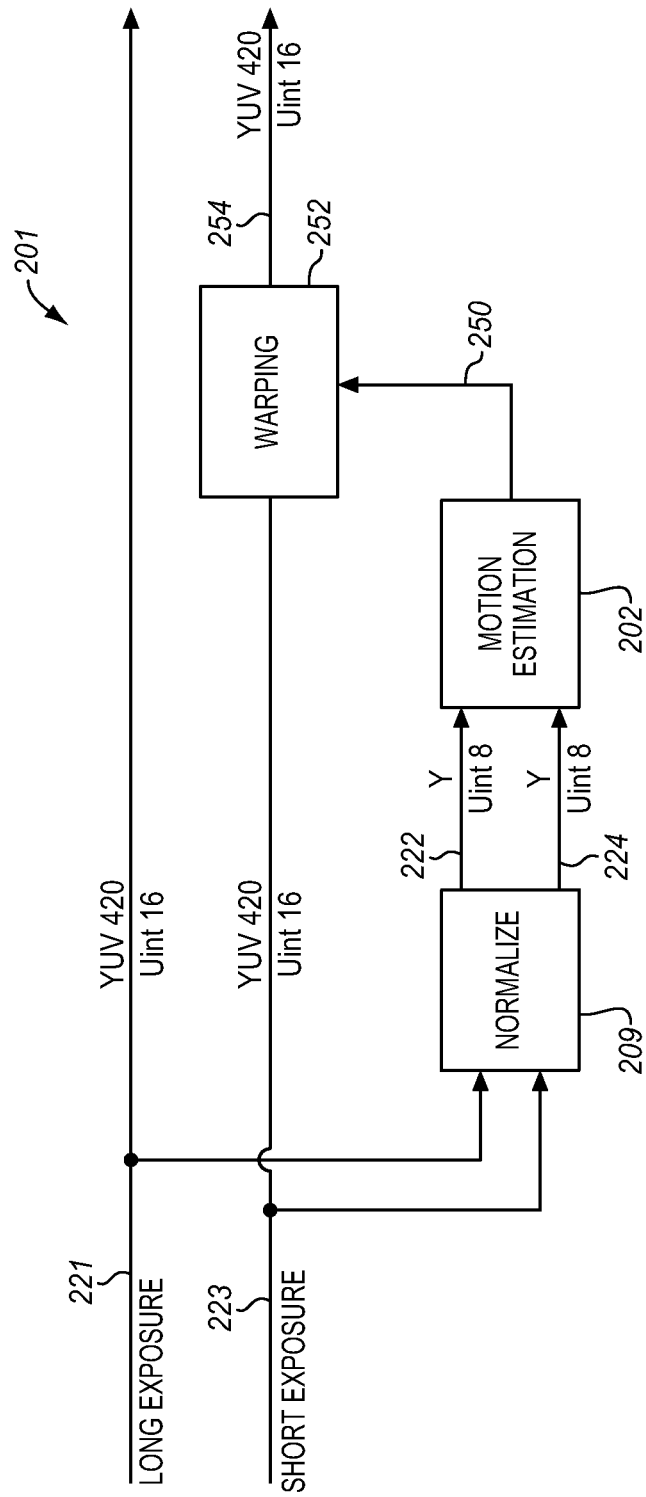
FIG. 2A is a block diagram of a global estimation system for a video capture device according to an embodiment.
Figure 2B:
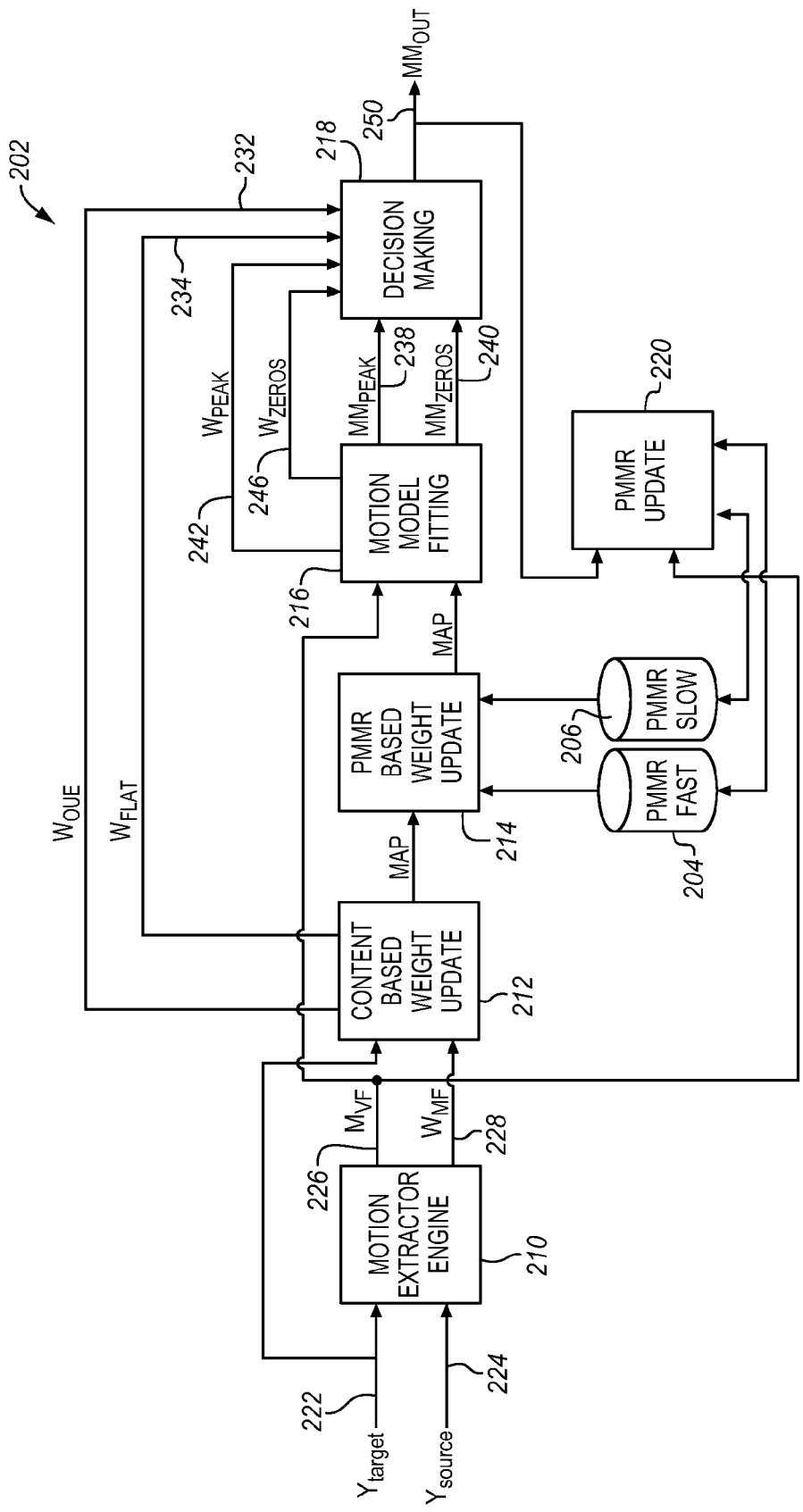
FIG. 2B is a block diagram of a camera motion estimation processing pipeline for a video capture device according to an embodiment.

FIG. 2A is a block diagram of a global alignment estimation system (GAE) 201. The GAE includes four functional units. A long exposed image sequence channel 221 and a short exposed image sequence channel 223 from a VHDR capture system such as those shown in FIG. 2B are provided to a normalization unit 209. The image sequences may be provided in any of a variety of different formats, depending on the camera and the nature of the image processing systems. In some embodiments, YUV420 frames are used in a uint16 (16-bit unsigned integer) format, however, other formats and image encoding may be used.

The brightness normalization unit 209 performs intensity normalization of the underexposed Y channel to match the overexposed Y channel. Normalization may be done in any of a variety of different ways. In one example, it is done by multiplication with an exposure ratio. This ratio may be the ratio of the exposure duration of the long exposure to the duration of the short exposure. In other words, a simple per-pixel multiplication of every pixel in the underexposed frame may be used. After the Y channels have been normalized by brightness to the overexposed range, the channels may be scaled down. This scaling may be adapted to suit the desired accuracy. In some embodiments there is a downscaling of luminance to 8-bits, such as a unit8 precision, together with a downscaling of the number of pixels by 8, 16, or even 32×.

The normalized image sequence channels 222, 224 are provided to a motion estimation unit 202 which determines projective matrix coefficients for the selected motion estimation model. In some embodiments, the long exposed frame is used as a reference image and the short exposed frame is used as a test image. The motion estimation may include multiple block matching stages.

The projection matrix 250 may then be supplied to a warping unit 252 that performs a back warp of the short exposed frame 223 to match the long exposed frame 221. This may be done using the projection matrix 250 that has been calculated by the motion estimation block 202. These operations may be performed in a specialized hardware or in a graphics processing unit (GPU) accelerator used for block matching stages.

FIG. 2B is a block diagram of a camera motion estimation processing pipeline 202 according to some embodiments. The pipeline includes a sequence of staged processing modules and two PMMR buffers 204, 206.

Motion Extractor Engine

Figure 4:
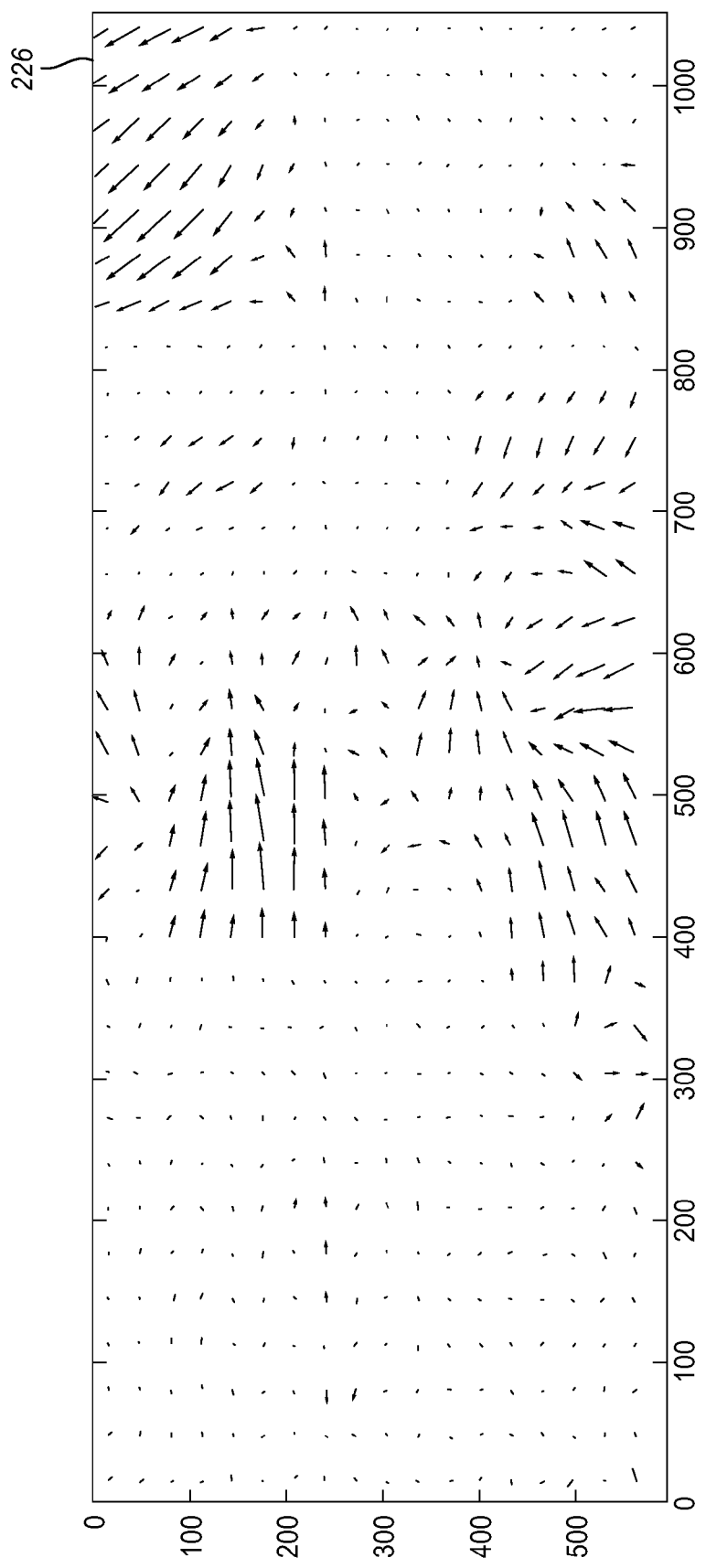
FIG. 4 is an example of a motion vector field for the normalized frame of FIGS. 3A and 3B according to an embodiment.

The input video frames are received at a motion extractor engine 210. This module may be fabricated from specialized hardware or general purpose hardware and extracts features or generates a grid-based motion vector field from pairs of images. In some embodiments, each image in the video sequence is compared to the image immediately before it. Features in the two images are identified and motion between the features is assessed. The results may be expressed in a sequence of motion vectors which may be represented, for example, in a motion vector field (MVF) as shown in FIG. 4.

A variety of different hardware accelerators may be used including a feature-based DVS (Digital Video Stabilization) statistics engine sometimes found in an image processing unit (IPU) or a grid-based Video Motion Estimation (VME) engine sometimes found in a graphics processing unit (GPU). In some embodiments, the output of the motion extractor block 210 is a motion vector field (MVF) that is 32× smaller than the images being processed. The 32× downscaling significantly improves power consumption parameters. Other downscaling factors may be used depending on the particular implementation. The remaining stages of the pipeline may all operate using the downscaled images.

Figure 3A:
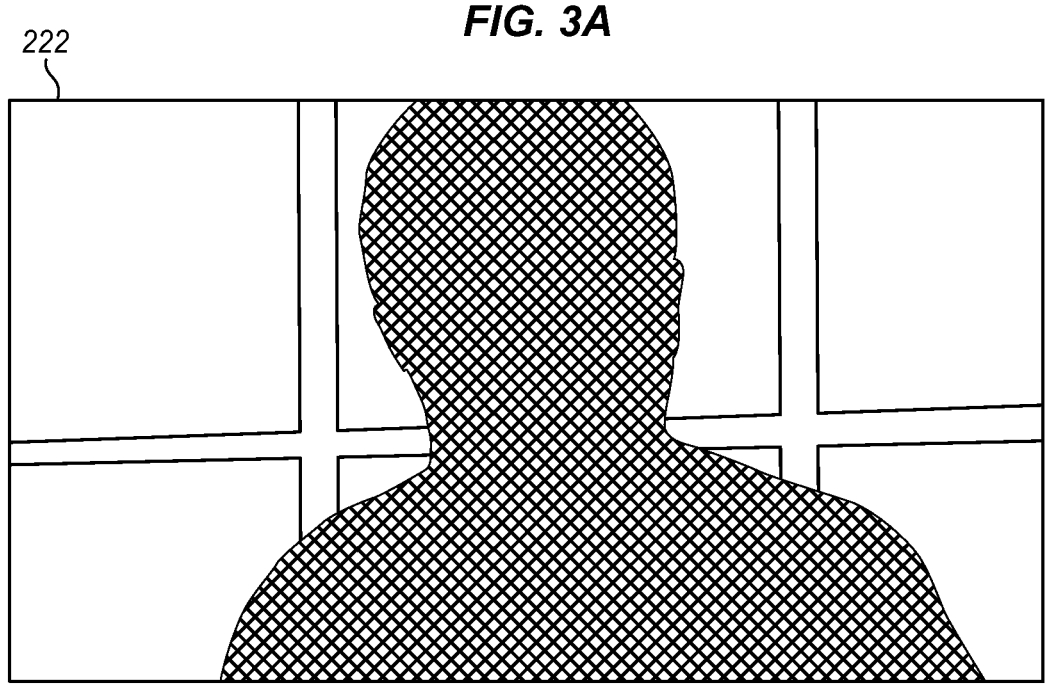
FIG. 3A is a diagram of normalized luminance channel frame for a long exposure video image according to an embodiment.
Figure 3B:
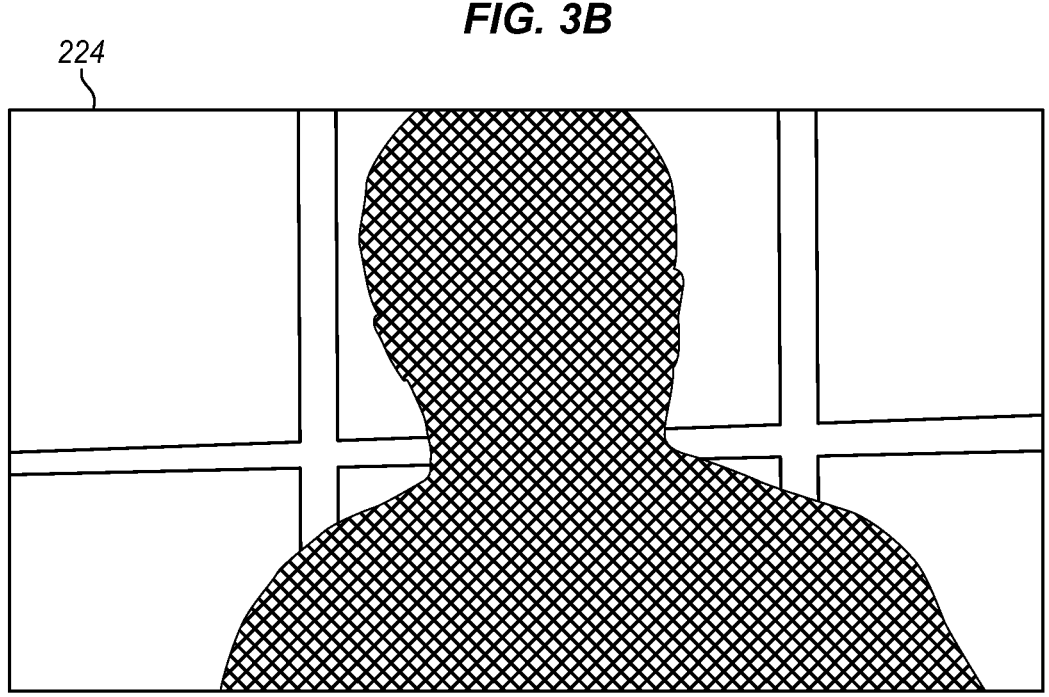
FIG. 3B is a diagram of normalized luminance channel frame for a short exposure video image according to an embodiment.

FIGS. 3A and 3B are diagrams of example images of a VHDR normalized video frame. These images are used for this example but in no way limit the range of possible scenes and subjects to which the present techniques and systems may be applied. The diagrams show only the Luminance channels of the target and source images. FIG. 3A shows Luminance channel data 222 for a target long exposure image. FIG. 3B shows Luminance channel data 224 for a source short exposure image. Both images reflect a luminance channel after normalization. These images are used as examples of VHDR input for camera motion estimation.

The two images have been normalized so that the luminance (brightness) substantially matches. This luminance is similar to but different from the luma of a YCrCb image frame, however, any desired luminance or brightness measure may be used. The differences between the images may be difficult to see in a downscaled diagram as represented by FIG. 3. The two images 222, 224 correspond to two consecutive VHDR frames with different exposure times.

FIG. 4 is an example of a MVF for the VHDR normalized frames of FIG. 3. The luminance channel target image $Y_{target}$ 222 and the luminance channel source image $Y_{source}$ 224 are provided as inputs to the motion extractor engine 210. The motion extractor engine produces the MVF 226 as an output. (See the example of FIG. 4.) It may also optionally produce a set of weights for the MVF, designated here as $W_{MVF}$. All of this data is provided to a content-based weight update block 212.

The motion estimation may be performed using Gauss pyramids. In some embodiments, each higher level of the pyramid is created from the previous one by horizontal and vertical filtering. This may be done, for example, with a three taps binomial filter. The image may then be down sampled by, for example, a factor of two. These Gauss pyramids may be saved as reference and test pyramid variables. The reference pyramid variable corresponds to the Gauss pyramid created form the reference image plane. The reference image is the normalized long exposure luminance frame. The test pyramid variable corresponds to the Gauss pyramid created from the test image or short exposure luminance frame plane. Pyramids determination loops may be generated from high and low pyramid variables to estimate a motion vector field for each pyramid level in that range by using, for example, a VME accelerator.

Content-Based Weight Update

Figure 5:
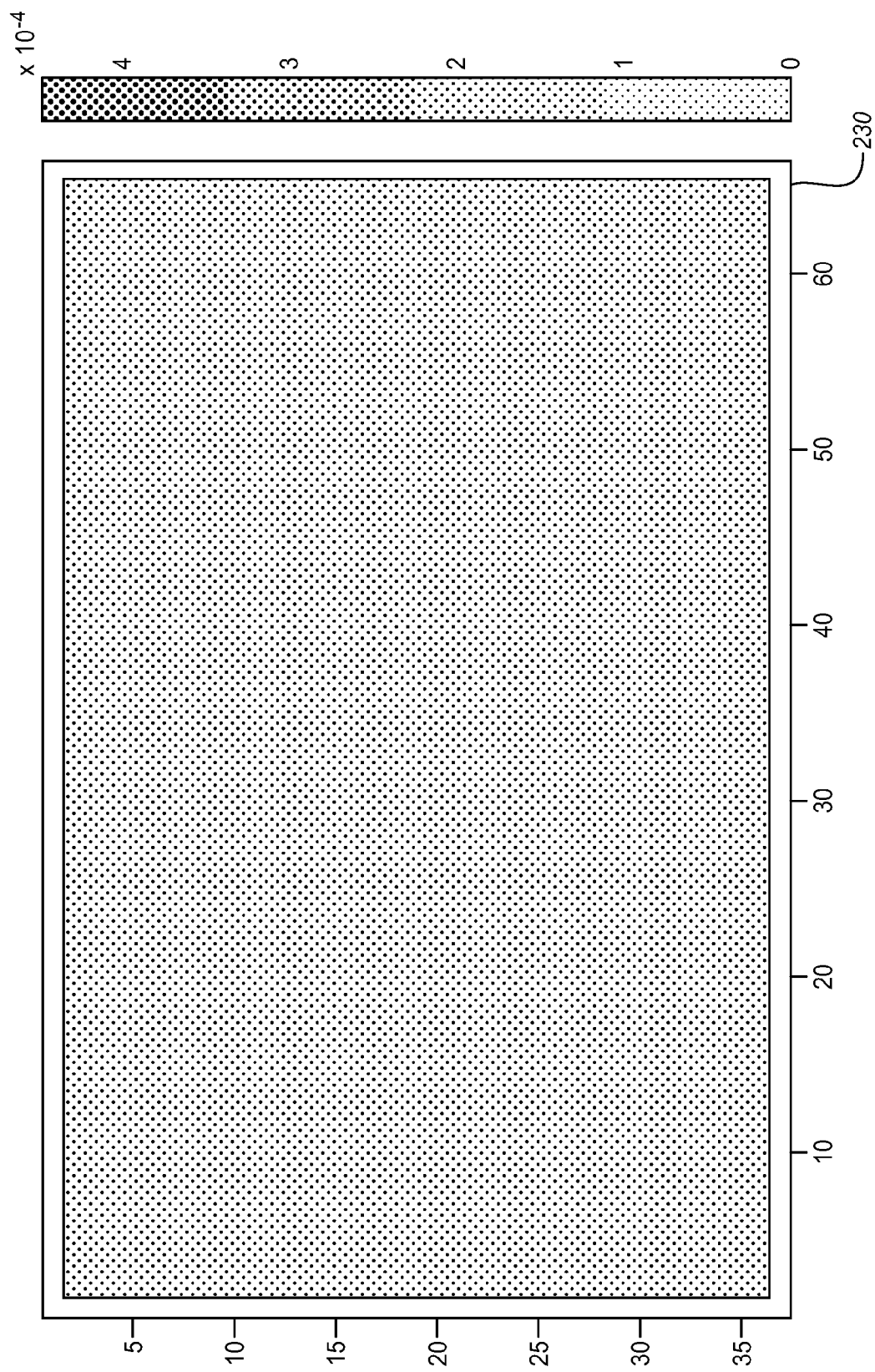
FIG. 5 is diagram of an initialized weight map for a motion vector field.

The content-based weight update block 212 selects and classifies regions in the scene. It receives the target frame 222, the MVF from the motion extraction and, optionally, the MVF weights and eliminates unreliable points in the MVF based on the content of the input frames 222, 224. For a motion extraction engine, such as VME, that does not have any weighting mechanism for its motion vector field, generating weights in this stage is particularly useful for the later stages of the pipeline 202. While a VME does produce SAD (Sum of Absolute Differences) Residuals, it is difficult to correlate this to the quality of the output MVF field. The initial weight map will have all equal values that sum to 1 with the exception of the border regions. The border regions are subject to the border effects of VME estimation techniques and therefore may be initialized to zero. Such a weight map in which all points on the map are equal values is shown in FIG. 5.

Other motion extraction engines provide a weight map 228 for the MVF. This may be used as an additional input to the content-based weight update 212 and used for estimating an initial map 230 for this block.

Figure 6A:
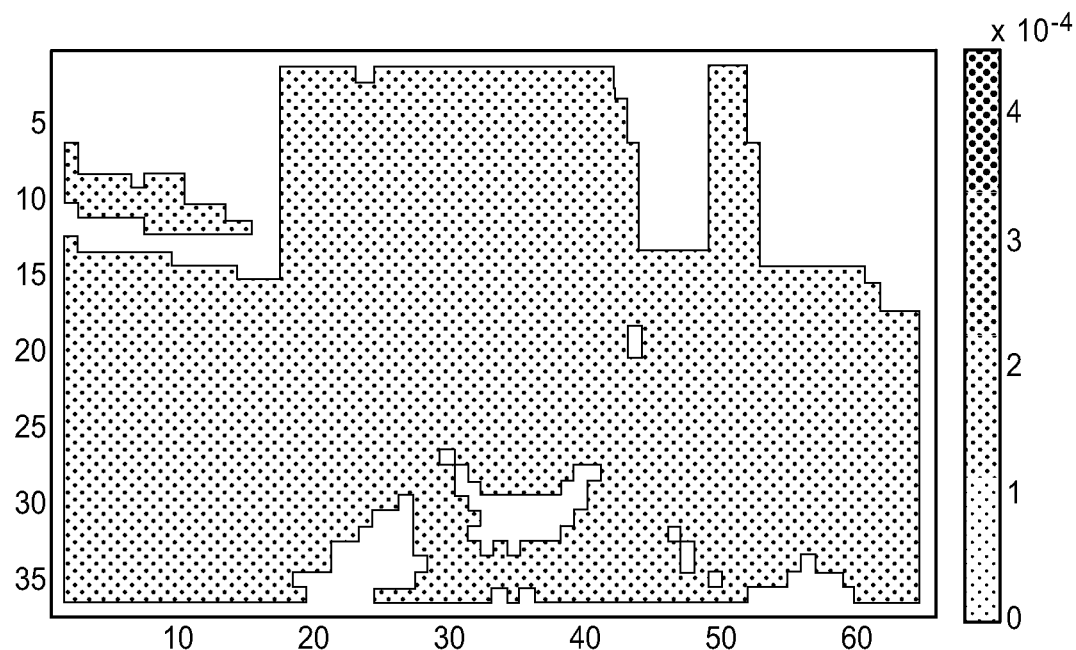
FIG. 6A is a diagram of a logical map of properly exposed blocks of the frame of FIGS. 3A and 3B as a weight map according to an embodiment.
Figure 6B:
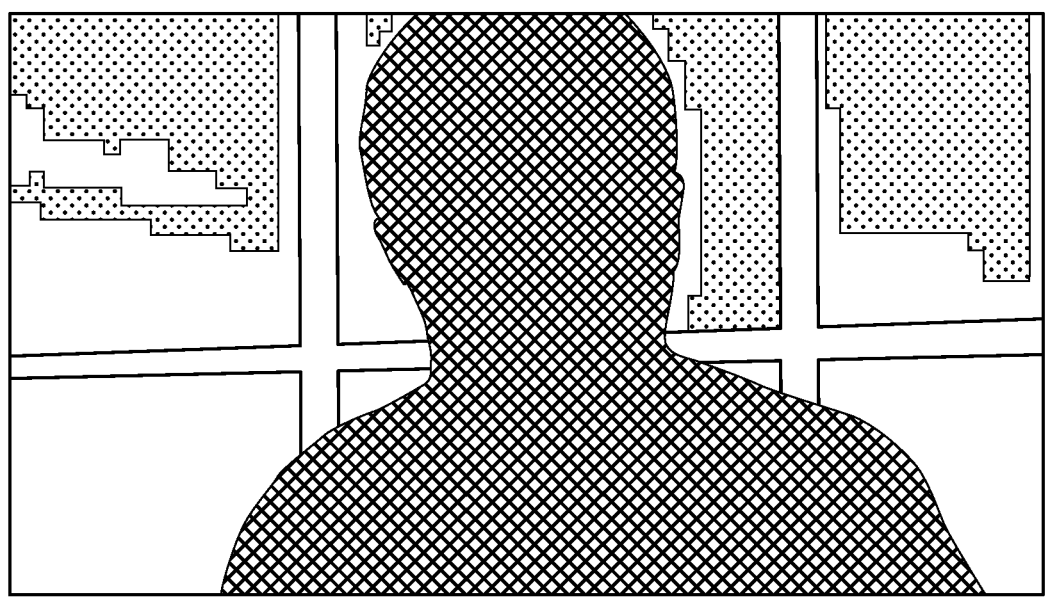
FIG. 6B is a diagram of the image of FIGS. 3A and 3B as a valid regions preview of the map of FIG. 6A according to an embodiment.

The content-based weight update engine 212 may first perform content-based filtering. This filtering may be used to eliminate over exposed and under exposed regions of the MVF by performing hard thresholding using the pixel intensity of the 32× downscaled images. In some embodiments, the motion vector field is generated for 16×16 blocks. As a result, the four levels above the low pyramid variable value may be used as a mean value plane that is used to generate a logical map of properly exposed blocks. This is shown in FIG. 6A, a diagram of a weight map after over and under exposed region elimination. FIG. 6B is a diagram of the image as a valid regions preview.

Figure 7A:
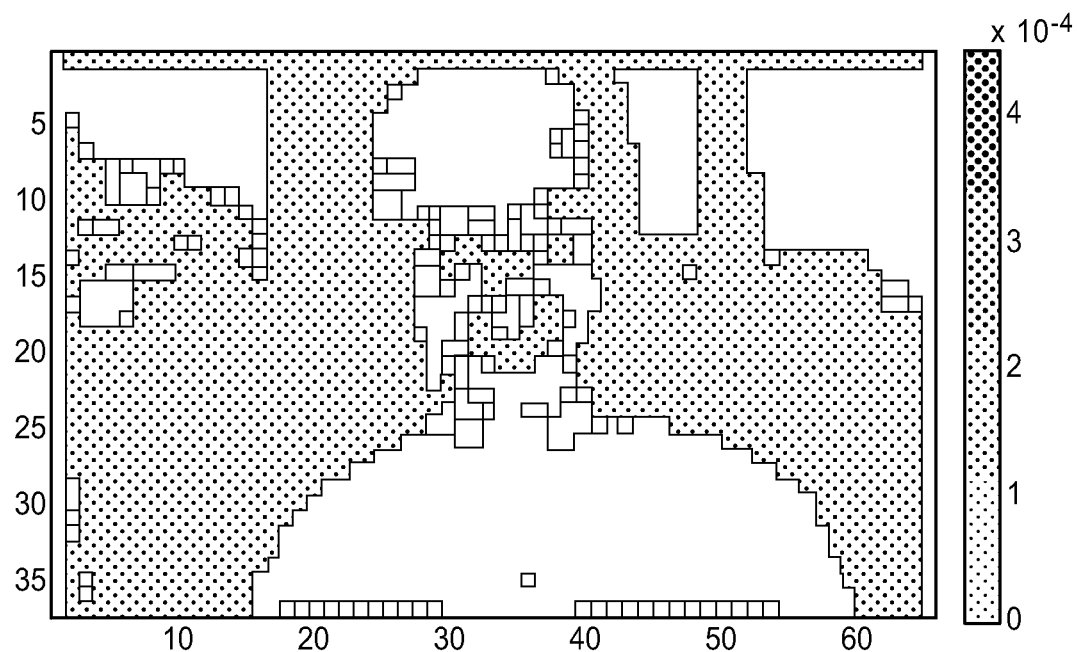
FIG. 7A is a diagram of a map of flat regions of the motion vector field of FIG. 4 according to an embodiment.

After the over and under exposure filtering, a second filter may be applied by eliminating the flat regions. SAD-based VME, for example, may make significant mistakes on flat regions. Eliminating the flat regions eliminates this source of errors. To do so, a flat regions map may be calculated and then applied to the main map as shown in FIG. 7A. This may be done for example by applying a soft threshold against an approximated variance map on an 8× downscaled input image.

Figure 7B:
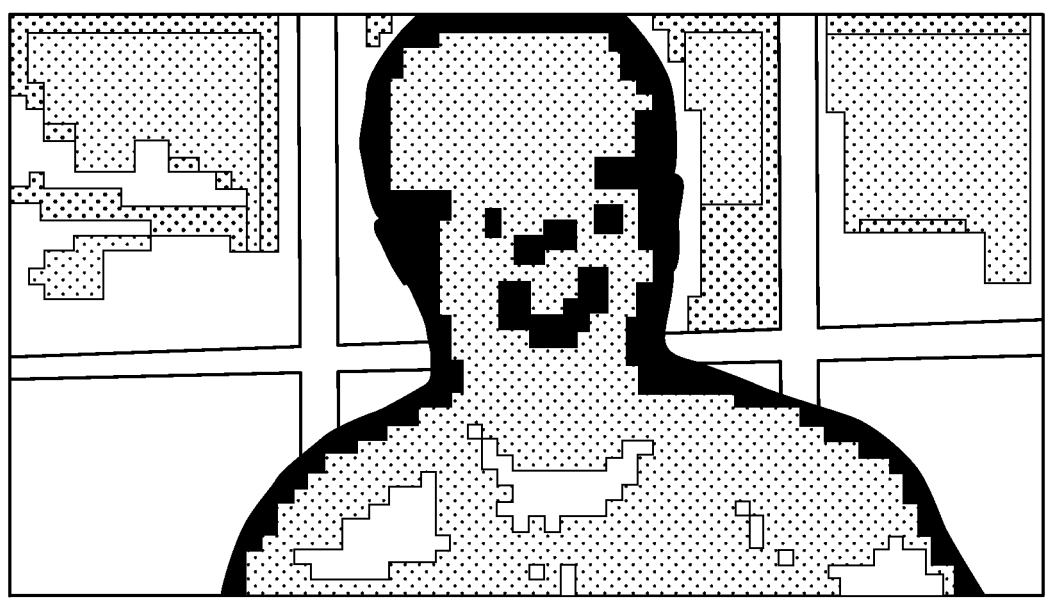
FIG. 7B is a diagram of the image of FIGS. 3A and 3B as a valid regions preview of the map of FIG. 7A according to an embodiment.

FIG. 7A is an example of a map of the flat regions as revealed by soft thresholding. FIG. 7B is a valid regions preview.

The content-based weight update block produces an updated map 230 which is provided as an input to a PMMR-based weight update engine 214, the next engine in the pipeline. In addition, it produces two scalar values: $w_{oue}$ 232; and $w_{flat}$ 234. These values represent the weights of the over and under exposed regions and of the flat regions respectively. These scalars are provided as input to a decision making engine 218 at the end of the pipeline.

PMMR-Based Weights Update

The next stage of the pipeline uses Previous Mismatch Regions (PMMR) maps. This improves the temporal consistency of the final result by suppressing short term local changes in the scene. Those maps which are being updated at the end of the pipeline are being used to suppress regions with short term or long term irregularities in the MVF. In this pipeline stage, the values in the weight map are compared to the values in a PMMR Fast map 204 and in a PMMR Slow map 206 and the minimal value of the three is taken for each point in the MVF. The resulting improved map 236 is provided as an output to the next stage 216 in the pipeline 202.

The initial PMMR values for each block at the start of the processing are all 1s. This is applied to the main map. After completing each motion estimation cycle, the initial maps of the motion estimation vectors are compared to the selected (tx, ty) pair and valid results are selected to update the PMMR maps. The PMMR maps then quickly converge to accurate values from the initialization values.

Figure 8A:
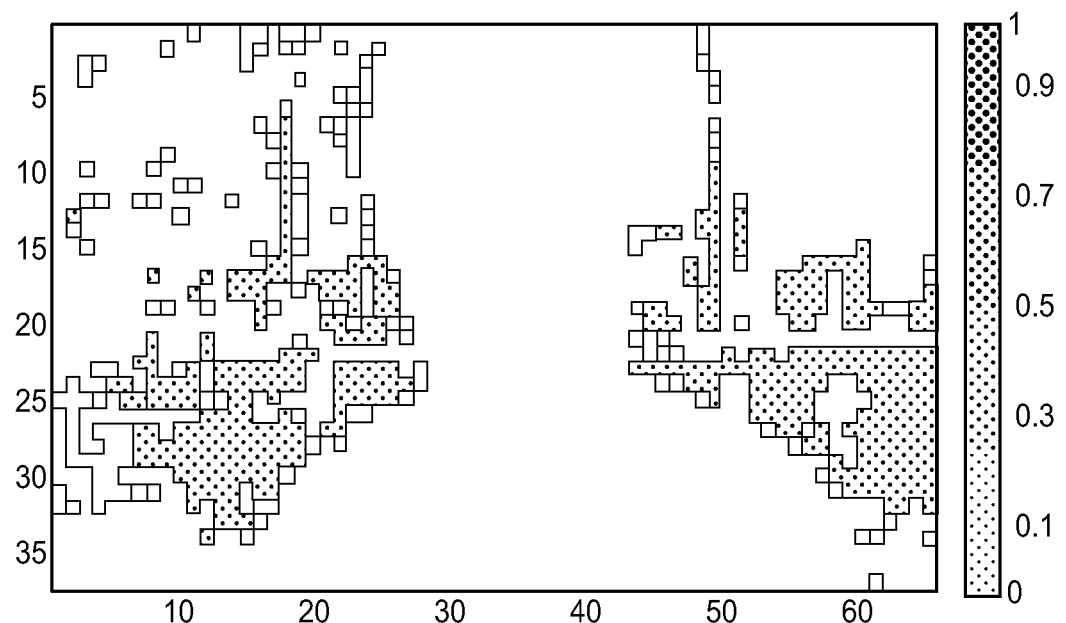
FIG. 8A is a diagram of a fast previous mismatch regions map for the frame of FIGS. 3A and 3B according to an embodiment.
Figure 8B:
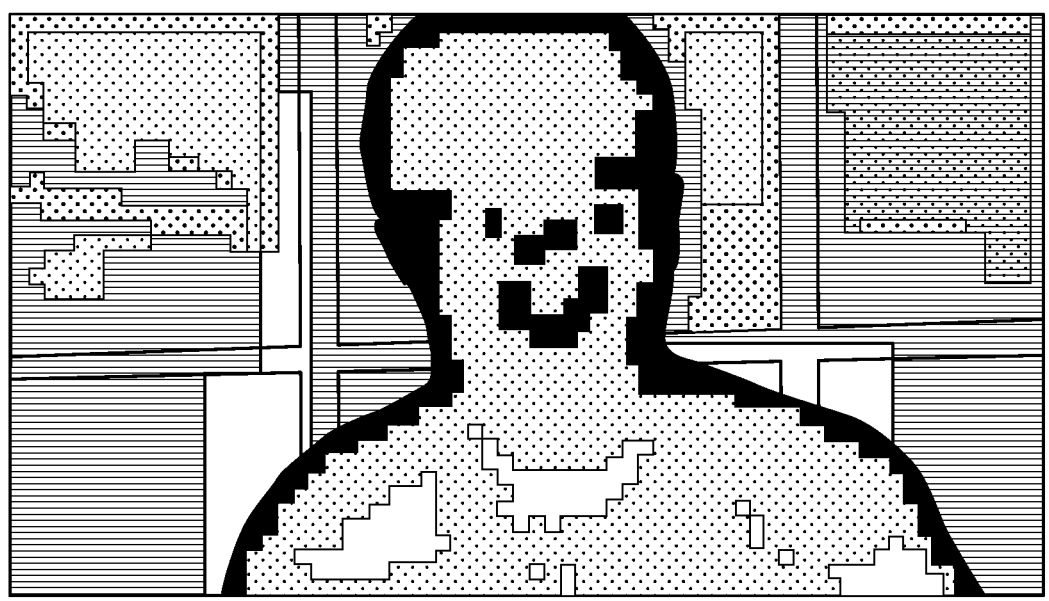
FIG. 8B is a diagram of an example valid region after applying the fast previous mismatch regions map according to an embodiment.
Figure 8C:
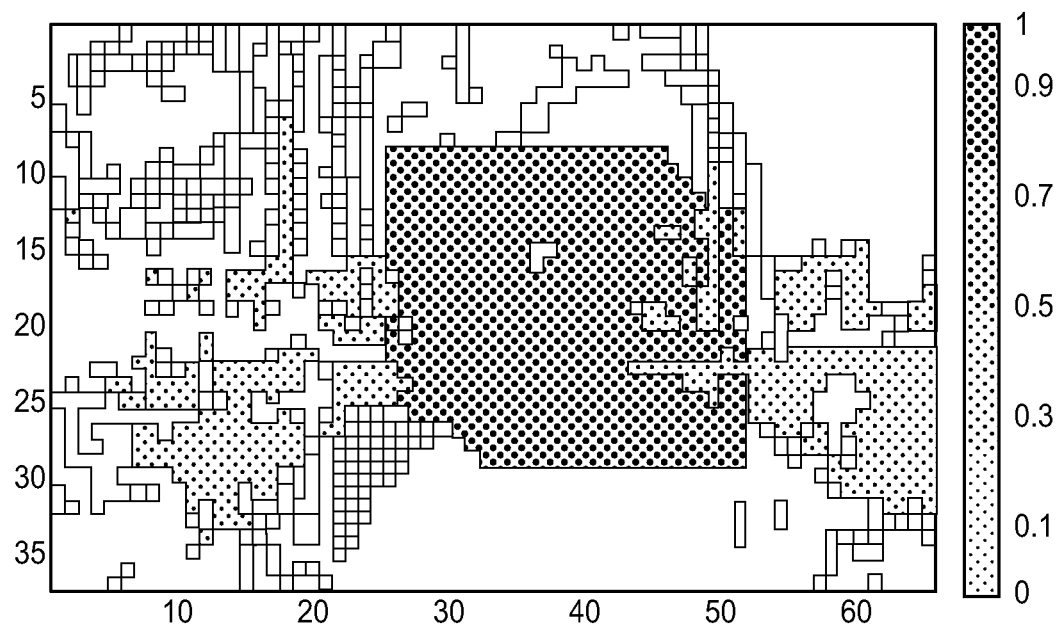
FIG. 8C is a diagram of slow previous mismatch regions map for the frame of FIGS. 3A and 3B according to an embodiment.
Figure 8D:
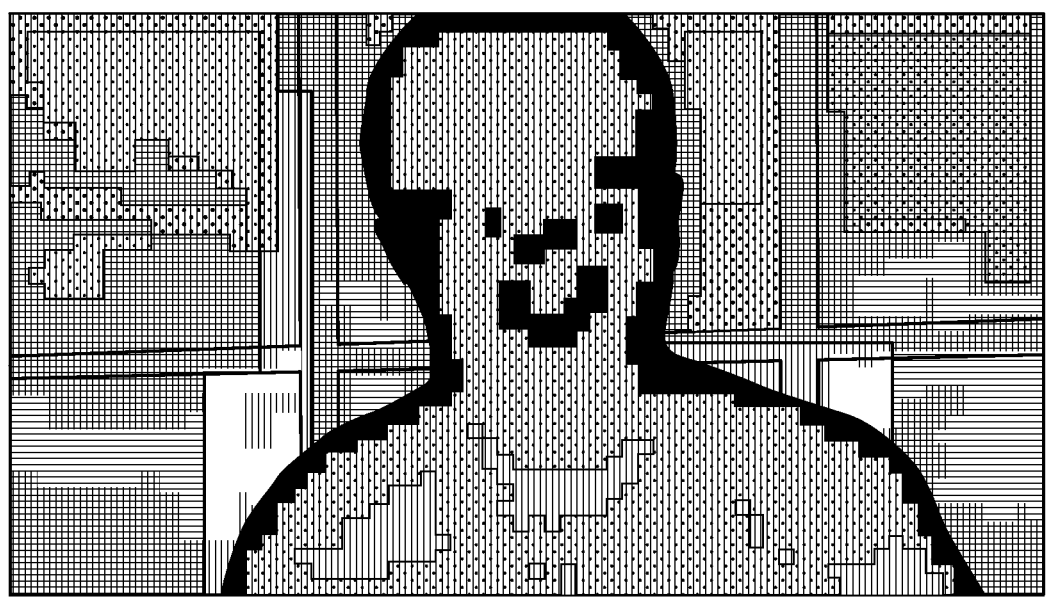
FIG. 8D is a diagram of an example valid region after applying the slow previous mismatch regions map according to an embodiment.

FIG. 8A shows an example of a fast PMMR map. FIG. 8C shows an example of a slow PMMR map. The central area in the slow PMMR map shows that a region of interest (ROI) system may eliminate the face from these determinations. The map is at zero for the face region. FIG. 8B shows an example valid region after applying the fast PMMR map. FIG. 8D shows an example valid region after applying the slow PMMR map.

Motion Model Fitting

The next stage in the pipeline is a motion model fitting block 216. This stage performs MVF data fitting from the updated MVF map 236 to a motion model. In the case of VHDR, weighted histogram filtering of horizontal and vertical translations may be used for extracting translation parameters. In one example the histograms are filtered and then the highest horizontal and vertical peaks are found. Alternatively, any other model may be used instead.

This stage then generates a motion matrix 238 determined based on the valid parts of the MVF. This is identified as $MM_{peak}$. This stage also generates weights 242 ($W_{peak}$) for the MVF elements that fit in the model. Using the peak tx (horizontal) and ty (vertical) values, simple window summing may be used. The width of the window is a function of the peak values themselves. Additionally, parts of the MVF with intensities that are close to zero may be treated separately. This may use 2D weighted histograms of the motion vector values that are close to zero. The separate outputs are identified as the motion matrix value in that intensity region ($MM_{zeros}$) 240 along with its weights ($W_{zeros}$) 246.

Decision Making

Figure 9:
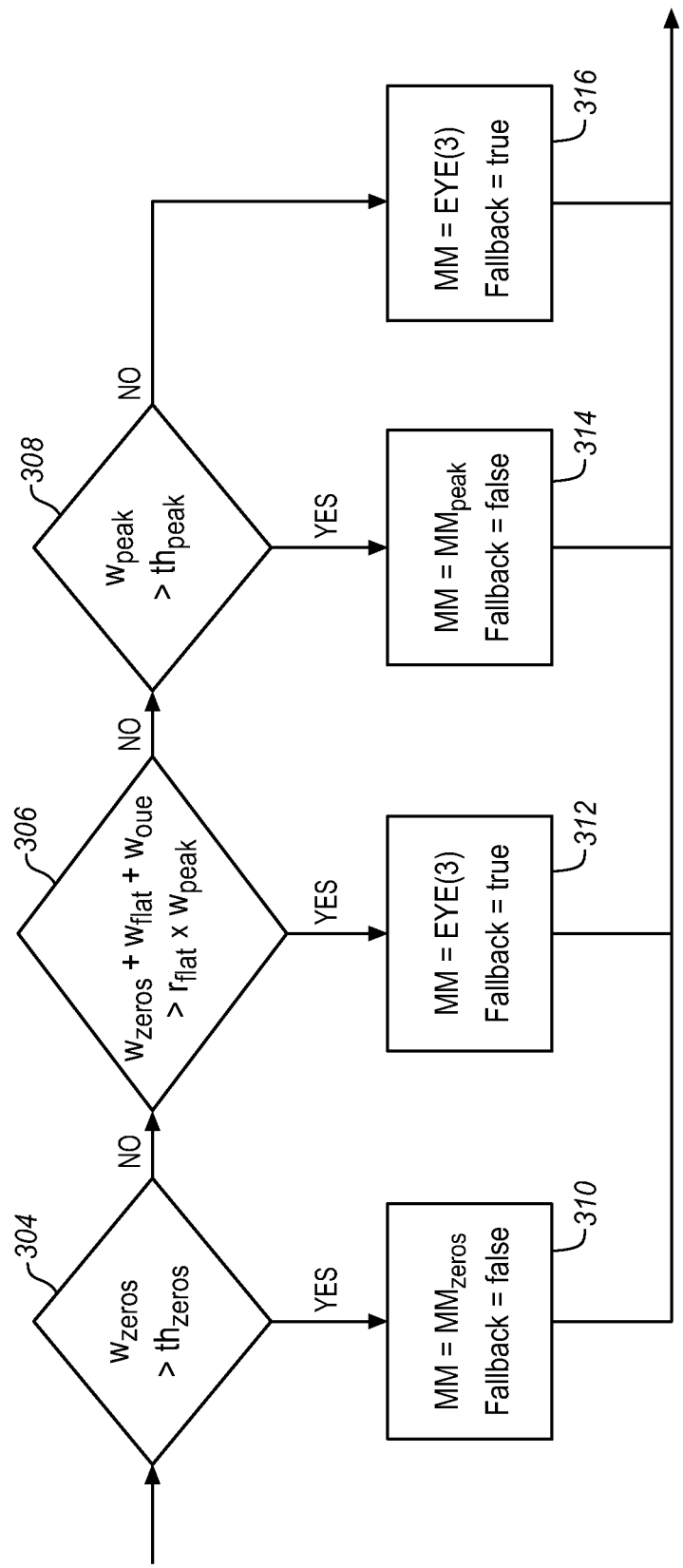
FIG. 9 is a process flow diagram of determining how to update weights according to an embodiment.

The next stage 218 in the pipeline 202 is a decision making block. This block is used to decide whether the output of the camera motion estimation block 202 should be a calculated peak value or a fallback value or state. FIG. 9 is a process flow diagram showing operations that may be performed in the decision making stage 218. The inputs to this stage, as shown in FIG. 2, are all of the outputs of the motion model fitting $MM_{peak}$ 238, MM zeros 240, $W_{peak}$ 242, and $W_{zeros}$ 246. In addition, the decision making stage receives the two scalar values $w_{oue}$ 232 and $w_{flat}$ 234 from the content-based weight update stage 212.

As shown in FIG. 9, the received weights are subjected to a series of tests. The tests may be performed in another order. More tests may be added and some of the tests may be removed. In the illustrated example, the first test 304 is to compare the weights of the MVF elements that generate the peak near zero ($w_{zeros}$ 246) to a threshold $th_{zeros}$. If the weights are above the threshold, then a significant part of the scene is static relative to the camera view. The camera is therefore most likely still or not moving and the motion model may be used. As shown, if the weights are above the threshold at 304, then at 310, the motion model MM is set to $MM_{zeros}$. The fallback motion model is set to false. The close to zero Motion Matrix ($MM_{zeros}$) is used as the output $MM_{out}$ 250.

If the weights, $W_{zero}$, do not exceed the threshold, then the next test 306 is applied. This test checks whether a sum of 1) the MVF weights of the regions that have been declared as flat ($w_{flat}$) 234, 2) as over or under exposed ($w_{oue}$) 232 and 3) close to zero motion ($w_{zeros}$) 246 is larger than a product of a flat ratio parameter $r_{flat}$ and the weight of the blocks that are close to the peak motion matrix expected values ($w_{peak}$) 242. If yes, than the decision goes to a decision block 312 in which the fallback state is declared as true. In this case the output $MM_{out}$ is the identity matrix (EYE(3)).

The second test is able to identify situations in which the MVF is unreliable. Such a situation is common when slow moving foreground objects are placed in front of a flat background. The background does not have enough detail to reliably determine motion. This is the case for the video conferencing situation of FIG. 3A. The central user sits in front of a background that includes a large amount of sky which can be a flat background. Using the fallback state, where fallback is set to true, provides stable output results even when the reliability of MVF is low.

If the weights do not exceed the product of the flat ratio parameter and the peak weights, then a third test 308 may be applied. This final check compares the weight of the MVF elements that have been selected with the peak motion matrix ($w_{peak}$) to a second threshold that has been set for this test. If the peak weight 242 exceeds the threshold value, then the result at 314 is to set to fallback to false and returns $MM_{peak}$ 238 as the final output 250 of the decision making block 218. If the peak weight 242 does not exceed the threshold, then at 316, the fallback state is set to true and the identity matrix (EYE(3)) is used again as the final output.

This third test obtains a proper motion matrix when the motion is larger than the close to zero motions of the first and second tests. The first test checks for very small motions that occur even when the camera is quite still. As an example, a movement of 3 pixels on a FullHD (1920×1080) frame is about 0.1%. However, this very small amount of motion can still cause visible flickering. These small motions are separated from the large motion detections since the small motion detection must be more precise and reliable. This is because human perception is more sensitive to motion errors when an object in a video image stream is almost still. The second test checks whether the large motions in the video sequence can actually be tracked by checking for flat and unreliable regions. The third test tracks the large motions if they exist and if they can reliably be tracked.

The output motion model 250 is used as the basis for the camera motion used by the video stabilization. The video stabilization may also use other motion indications such as object motion, scene motion, and background motion for further stabilization in addition to the camera motion. In some embodiments, the DVS receives the output motion model and then adjusts the positions of the corresponding frames to reduce or eliminate the motion. If the camera motion is upwards, then the frame may be adjusted downwards to compensate. If the fallback is set to false 310, 314, then the frames are not adjusted because the motion model indicates that there is no camera motion. The frames may nevertheless be adjusted in the DVS due to subject, background or some other motion.

The thresholds $th_{zeros}$ and $th_{peak}$, and the ratio $r_{flat}$ may be set empirically and adjusted over time. They may also be set to an initial value and then improved by learning. When the system is evaluating all or most of the frames of a video sequence, then the nature of the scene should not change rapidly. If the system toggles the fallback state for either threshold test 304, 308, then the parameters may be set too low. These parameters may be adjusted so that fallback does not switch from false to true with too much frequency.

Update PMMR

The final motion matrix result $MM_{out}$ 250 may be applied to a maintenance stage 220 of the pipeline. This stage receives the initial MVF 226 and updates the PMMR fast 204 and PMMR slow 206 buffers that are used by the PMMR weight-based update stage 214. The update PMMR stage checks the initial MVF to see which parts of it would fit into the final $MM_{out}$ result with some tolerance. The tolerance is a function of the motion intensity to compensate for rolling shutter lag, geometric distortion of the lens, and depth of the field differences as objects move. This stage generates a map from the fitting. The generated map may then be compared to the PMMR Fast and PMMR Slow maps. These maps then converge to values in the valid map in parameterized steps.

In embodiments, the PMMR Fast map can change its values from 0 to 1 (or vice versa) in 5-6 iterations. This map may be used to effectively suppress large moving objects that are entering the scene. The PMMR Slow map on the other side has much smaller increment and decrement steps. In embodiments, the decrement steps are bigger than the increment steps. The PMMR Slow map may be used to effectively suppress regions with periodic movements such as human body parts in teleconferencing and similar objects.

As a further improvement, if outputs are available from a face detection system then these outputs may also be used to suppress face regions from the MVF, since regions that contain a face will most likely contain significant local motion. The suppression of face regions may be done by setting appropriate regions in the PMMR Slow map directly to zero. FIG. 8C shows an example of a face region that has been detected and set to zero in the PMMR Slow map.

When updates have been applied to the PMMR maps, the updates may also be wrapped with an equivalent motion matrix. Accordingly, in case of the significant camera motion, the maps properly reflect the content of the next frame pair. In addition, the increase and decrease steps of the PMMR Fast and PMMR Slow maps may also be dynamically changed based on the speed of the camera motion. This may provide a faster adaptation to motion in the case of a fast scene change.

This approach may be used with a variety of different portable or small video capture devices and allows for video stabilization in real time as the video is captured even when the system does not have substantial processing resources. It may be incorporated into a Video HDR system. It is also suitable for multi-frame CP techniques such as Ultra Low Light (ULL), HDR, SZ (Super Zoom), etc. It is suitable for video uses with DVS and FRC. For mobile and small devices, such Internet of Things (IoT) nodes, the low complexity and high reliability for estimating camera motion makes the described techniques and structures particularly suitable.

Figure 10:
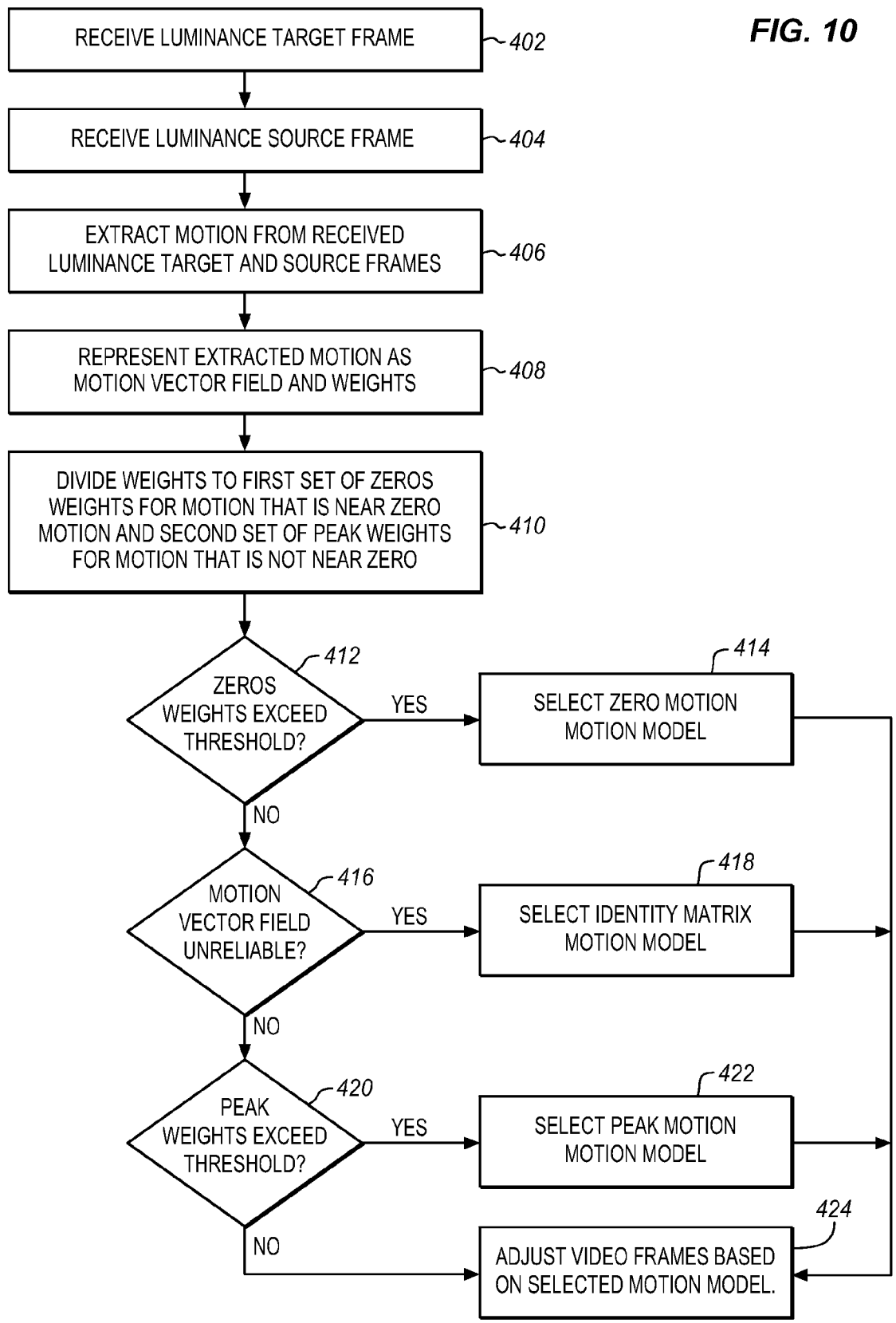
FIG. 10 is a process flow diagram of determining how to update weights from an input target and source frame according to an embodiment.

FIG. 10 is a process flow diagram of operations performed by the pipeline 202 of FIG. 2. At 402 a video sequence of long exposure frames including a target frame is received at a video motion estimation engine. At 404, a video sequence of short exposure frames, including a source frame are received at the video estimation engine. These are received simultaneously and are synchronized. At 406 motion is extracted from the received luminance target and source frames. At 408 the extracted motion is represented as a motion vector field and weights.

At 410 the weights are divided into two or more different sets. The first set is the set of zeros weights. These are for motion that is near zero motion. The second set of weights is the peak weights for motion that is not near zero.

The two sets of weights are analyzed in a sequence of tests. The first test at 412 is to compare the zeros weights to a threshold. If the zeros weights exceed the threshold, then this indicates that there is very little motion in the scene captured by the source and target frames. As a result at 414 a motion model for zero motion is selected.

In a second test at 416 the motion vector field is tested for unreliability. If it is determined to be unreliable then at 418 an identify matrix motion model is selected. There may be many different tests of reliability. One example described above is when the background does not provide enough feature detail against which to accurately assess motion. With a flat background, a flat ratio parameter factored by the peak weights may be compared to zeros weights. Alternatively, another test may be used.

At 420 the peak weights are tested to determine whether they exceed a threshold. If so then at 422 a peak motion motion model is selected. With any one of these tests, the default is the identity matrix model. More or fewer tests may be used to provide for other particular situations. When none of the tested situations are present, then the default identity matrix model may be used.

After a particular motion model has been selected then at 424 the target video frame is adjusted based on the selected motion model.

System Architecture

Figure 11:
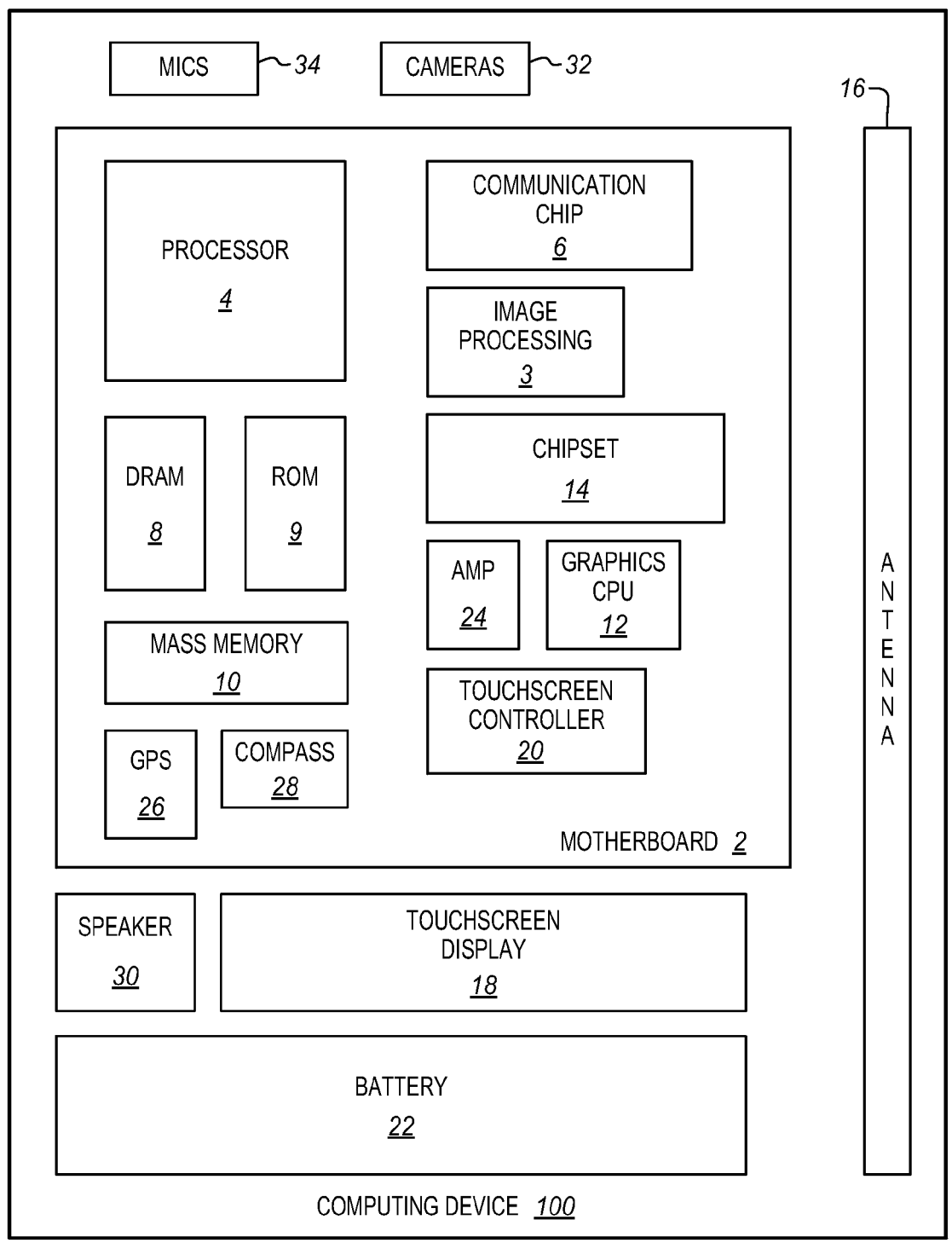
FIG. 11 is a block diagram of a computing device incorporating camera motion video stabilization according to an embodiment.

FIG. 11 is a block diagram of a single computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 are coupled to an image processing chip 3 to perform format conversion, coding and decoding, noise reduction and video stabilization as described herein. The processor 4 is coupled to the image processing chip to drive the processes, set parameters, and may participate in or perform some of the more complex functions, especially with video processing and stabilization. Video stabilization may also be performed using video stored in mass memory 10 or received through a network or other communications interface 6. The image processing chip 3 may assist with coding and decoding stored video or this may be performed by the processor. The processor 4 may include a graphics core or there may be separate graphics processor in the system. The decoded, stabilized video may be rendered on the local display 18, stored in memory 10, or sent to another device through network or other communications interface 6.

In various implementations, the computing device 100 may be eyewear, a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 100 may be any other electronic device that processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes receiving a luminance target frame and a luminance source frame of a sequence of video frames of a scene, extracting motion from the received luminance target and source frames and representing the motion as a motion vector field and weights, dividing the weights into a first set of zeros weights for motion in the motion vector field that is near zero motion and a second set of peak weights for motion in the motion field that is not near zero, comparing the zeros weights to a threshold to determine whether there is motion in the scene and if the zeros weights exceed the threshold then selecting a zero motion motion model, and adjusting a frame of the video sequence corresponding to the target frame based on the selected motion model.

Further embodiments include normalizing the luminance of the target frame to the luminance of the source frame.

Further embodiments include determining whether the motion vector field is unreliable and, if the motion vector field is unreliable, then selecting an identity matrix motion model.

Further embodiments include comparing the peak weights to a threshold and, if the peak weights exceed the threshold, then selecting a peak motion motion model.

In further embodiments the luminance target frame is for a long exposure image and the luminance source frame is for a short exposure image.

Further embodiments include modifying the weights before dividing the weights by analyzing the content of the target frame.

Further embodiments include modifying the weights before dividing the weights by using a previous mismatch regions map.

Further embodiments include updating the previous mismatch regions map using spatial and temporal scene analysis.

In further embodiments updating comprises suppressing short term local changes in the scene and suppressing long term changes in the scene.

In further embodiments applying previous mismatch region maps comprises comparing values in the weights to values in a fast previous mismatch region map and in a slow previous mismatch region map and using the least of the determined weight and the weights from the maps as the final weight.

In further embodiments extracting motion comprises applying previous mismatch region maps to suppress regions with short term and long term irregularities.

Further embodiments include modifying the weights before dividing the weights by eliminating flat regions by applying a soft threshold against a variance map on an input region.

Some embodiments pertain to a computer-readable medium having instructions that when operated on by the computer cause the computer to perform operations that include receiving a luminance target frame and a luminance source frame of a sequence of video frames of a scene, extracting motion from the received luminance target and source frames and representing the motion as a motion vector field and weights, dividing the weights into a first set of zeros weights for motion in the motion vector field that is near zero motion and a second set of peak weights for motion in the motion field that is not near zero, comparing the zeros weights to a threshold to determine whether there is motion in the scene and if the zeros weights exceed the threshold then selecting a zero motion motion model, and adjusting a frame of the video sequence corresponding to the target frame based on the selected motion model.

Further embodiments include normalizing the luminance of the target frame to the luminance of the source frame.

Further embodiments include determining whether the motion vector field is unreliable and, if the motion vector field is unreliable, then selecting an identity matrix motion model.

Some embodiments pertain to a motion video stabilization system that includes an image sensor to record a sequence of video frames, a memory to store the sequence of video frames, a motion extractor engine to extract motion from a luminance target frame and a luminance source frame from the image sensor and to represent the motion as a motion vector field and weights, dividing the weights into a first set of zeros weights for motion in the motion vector field that is near zero motion and a second set of peak weights for motion in the motion field that is not near zero and to compare the zeros weights to a threshold to determine whether there is motion in the scene and if the zeros weights exceed the threshold then selecting a zero motion motion model, and a motion estimation module to adjust a frame of the video sequence corresponding to the target frame based on the selected motion model.

Further embodiments include a weight update module to modify the weights before dividing the weights by analyzing the content of the target frame.

Further embodiments include a weight update module to modify the weights before dividing the weights by using a previous mismatch regions map.

Further embodiments include previous mismatch region update module to update the previous mismatch regions map using spatial and temporal scene analysis.

In further embodiments extracting motion comprises applying previous mismatch region maps to suppress regions with short term and long term irregularities.

What is claimed is:

1. A method comprising:

receiving a luminance target frame and a luminance source frame of a sequence of video frames of a scene;

extracting motion from the received luminance target and source frames and representing the motion as a motion vector field and weights;

dividing the weights into a first set of zeros weights for motion in the motion vector field that is near zero motion and a second set of peak weights for motion in the motion field that is not near zero;

comparing the zeros weights to a threshold to determine whether there is motion in the scene and if the zeros weights exceed the threshold then selecting a zero motion motion model; and adjusting a frame of the video sequence corresponding to the target frame based on the selected motion model.

2. The method of claim 1, further comprising normalizing the luminance of the target frame to the luminance of the source frame.

3. The method of claim 1, further comprising determining whether the motion vector field is unreliable and, if the motion vector field is unreliable, then selecting an identity matrix motion model.

4. The method of claim 1, further comprising comparing the peak weights to a threshold and, if the peak weights exceed the threshold, then selecting a peak motion motion model.

5. The method of claim 1, wherein the luminance target frame is for a long exposure image and the luminance source frame is for a short exposure image.

6. The method of claim 1, further comprising modifying the weights before dividing the weights by analyzing the content of the target frame.

7. The method of claim 1, further comprising modifying the weights before dividing the weights by using a previous mismatch regions map.

8. The method of claim 7, further comprising updating the previous mismatch regions map using spatial and temporal scene analysis.

9. The method of claim 8, wherein updating comprises suppressing short term local changes in the scene and suppressing long term changes in the scene.

10. The method of claim 8, wherein applying previous mismatch region maps comprises comparing values in the weights to values in a fast previous mismatch region map and in a slow previous mismatch region map and using the least of the determined weight and the weights from the maps as the final weight.

11. The method of claim 1, wherein extracting motion comprises applying previous mismatch region maps to suppress regions with short term and long term irregularities.

12. The method of claim 1, further comprising modifying the weights before dividing the weights by eliminating flat regions by applying a soft threshold against a variance map on an input region.

13. A computer-readable medium having instructions that when operated on by the computer cause the computer to perform operations comprising:

receiving a luminance target frame and a luminance source frame of a sequence of video frames of a scene;

extracting motion from the received luminance target and source frames and representing the motion as a motion vector field and weights;

dividing the weights into a first set of zeros weights for motion in the motion vector field that is near zero motion and a second set of peak weights for motion in the motion field that is not near zero;

comparing the zeros weights to a threshold to determine whether there is motion in the scene and if the zeros weights exceed the threshold then selecting a zero motion motion model; and adjusting a frame of the video sequence corresponding to the target frame based on the selected motion model.

14. The medium of claim 13, the operations further comprising normalizing the luminance of the target frame to the luminance of the source frame.

15. The medium of claim 13, the operations further comprising determining whether the motion vector field is unreliable and, if the motion vector field is unreliable, then selecting an identity matrix motion model.

16. A motion video stabilization system comprising:
an image sensor to record a sequence of video frames;
a memory to store the sequence of video frames;
a motion extractor engine to extract motion from a luminance target frame and a luminance source frame from the image sensor and to represent the motion as a motion vector field and weights;
dividing the weights into a first set of zeros weights for motion in the motion vector field that is near zero motion and a second set of peak weights for motion in the motion field that is not near zero and to compare the zeros weights to a threshold to determine whether there is motion in the scene and if the zeros weights exceed the threshold then selecting a zero motion motion model; and
a motion estimation module to adjust a frame of the video sequence corresponding to the target frame based on the selected motion model.

17. The system of claim 16, further comprising a weight update module to modify the weights before dividing the weights by analyzing the content of the target frame.

18. The system of claim 16, further comprising a weight update module to modify the weights before dividing the weights by using a previous mismatch regions map.

19. The system of claim 18, further comprising previous mismatch region update module to update the previous mismatch regions map using spatial and temporal scene analysis.

20. The system of claim 16, wherein extracting motion comprises applying previous mismatch region maps to suppress regions with short term and long term irregularities.

* * * * *